United States Patent
Serrano et al.

(10) Patent No.: US 12,529,426 B2
(45) Date of Patent: Jan. 20, 2026

(54) COUPLING ASSEMBLIES FOR ROTARY VALVES AND RELATED VALVE TRIMS

(71) Applicant: FISHER CONTROLS INTERNATIONAL LLC, Marshalltown, IA (US)

(72) Inventors: Jesse Serrano, Marshalltown, IA (US); Robert M. Meloy, Marshalltown, IA (US)

(73) Assignee: FISHER CONTROLS INTERNATIONAL LLC, Marshalltown, IA (US)

( * ) Notice: Subject to any disclaimer, the term of this patent is extended or adjusted under 35 U.S.C. 154(b) by 0 days.

(21) Appl. No.: 18/415,385

(22) Filed: Jan. 17, 2024

(65) Prior Publication Data
US 2025/0230874 A1    Jul. 17, 2025

(51) Int. Cl.
*F16K 1/22* (2006.01)
*F16K 1/36* (2006.01)

(52) U.S. Cl.
CPC . *F16K 1/36* (2013.01); *F16K 1/22* (2013.01)

(58) Field of Classification Search
CPC ......... F16K 1/36; F16K 1/22; F16B 2013/009
See application file for complete search history.

(56) References Cited

U.S. PATENT DOCUMENTS

| | | | | |
|---|---|---|---|---|
| 2,552,117 A | * | 5/1951 | Roswell | F16K 1/22 251/308 |
| 2,884,224 A | * | 4/1959 | Fawkes | F16K 1/2265 251/306 |
| 2,991,043 A | * | 7/1961 | Saar | F16K 1/2263 251/364 |
| 3,050,781 A | * | 8/1962 | Killian | B29C 45/14 425/DIG. 47 |
| RE26,405 E | * | 6/1968 | Killian | F16K 1/2265 251/306 |
| 3,412,975 A | * | 11/1968 | Kurkjian, Jr. | F16K 1/16 251/307 |
| 3,517,689 A | * | 6/1970 | Roos | F16K 1/2265 137/329.01 |

(Continued)

FOREIGN PATENT DOCUMENTS

WO    WO-2019038990 A1 *    2/2019   ............ B60R 13/00

OTHER PUBLICATIONS

"Fisher™ 8580 Rotary Valve" Product Bulletin, Fisher Controls International LLC, 51.6:8580 (Oct. 2023).

*Primary Examiner* — Marina A Tietjen
(74) *Attorney, Agent, or Firm* — MARSHALL, GERSTEIN & BORUN LLP (57) ABSTRACT

Rotary valves and related valve trims. A valve trim for a rotary valve assembly includes a valve shaft, a flow control element coupled to the valve shaft, and a coupling assembly for coupling the valve shaft to the flow control element. The coupling assembly includes an expansion pin having a central bore and a taper pin sized for insertion in a central bore of the expansion pin. The expansion pin and the taper pin together are sized for insertion into a cross bore of the flow control element and through a lateral bore of the valve shaft. A retainer is arranged to maintain the taper pin in the central bore of the expansion pin. The retainer limits movement of the taper pin relative to the expansion pin.

21 Claims, 10 Drawing Sheets

(56) References Cited

U.S. PATENT DOCUMENTS

| | | | | |
|---|---|---|---|---|
| 3,591,133 A * | 7/1971 | Miles | F16K 1/22 | 251/210 |
| 3,630,485 A * | 12/1971 | Williams | F16K 1/2263 | 251/307 |
| 3,642,024 A * | 2/1972 | La Coste | F01D 17/148 | 137/340 |
| 4,057,217 A * | 11/1977 | MacDonald | F16K 1/22 | 251/308 |
| 4,243,203 A * | 1/1981 | Mack | F16K 1/222 | 251/305 |
| 4,496,135 A * | 1/1985 | Scobie | F16K 1/2266 | 251/308 |
| 4,768,750 A * | 9/1988 | Wilson | F16D 1/0894 | 403/324 |
| 5,344,252 A * | 9/1994 | Kakimoto | F16D 1/0888 | 411/63 |
| 5,743,512 A * | 4/1998 | Greenberg | F16K 1/22 | 251/307 |
| 11,067,176 B2 * | 7/2021 | DeFelice | F16K 31/5282 | |
| 2011/0214288 A1 * | 9/2011 | Dalluge | F16K 27/0218 | 29/700 |
| 2019/0162315 A1 * | 5/2019 | Matsumura | F16K 5/0642 | |

* cited by examiner

COUPLING ASSEMBLIES FOR ROTARY VALVES AND RELATED VALVE TRIMS

FIELD OF THE DISCLOSURE

The present disclosure relates to rotary valves and, more specifically, to coupling assemblies for rotary valves and related valve trims.

BACKGROUND

Rotary valves such as butterfly valves may be used to control the flow of fluids in piping systems. Rotary valves include a valve body defining a flow passage, a rotatable shaft, and a generally circular disk. The disk is attached to the shaft that may be connected to an actuator which rotates the disk within the valve body to open and close the flow passage.

Disk valves may be operated manually, pneumatically, hydraulically or electrically. When the disk is rotated so that it is parallel to the flow, the valve is fully open. Rotating the disk until it is perpendicular to the flow closes the valve.

SUMMARY

In accordance with an implementation of the present invention, a rotary valve includes a valve body having an inlet, an outlet, a flow passage extending between the inlet and the outlet, and a through bore that extends into the flow passage. A valve shaft is rotatably disposed in the through bore of the valve body, and a flow control element is coupled to the valve shaft and disposed in the flow passage. The flow control element is shiftable in response to rotation of the valve shaft between an open position and a closed position. An upper portion of the flow control element includes a mounting bore sized to receive a lower portion of the valve shaft. The flow control element includes a cross bore intersecting the mounting bore. The lower portion of the valve shaft includes a lateral bore. The lateral bore of the valve shaft is arranged to align with the cross bore of the flow control element. A coupling assembly for coupling the valve shaft to the flow control element is included. The coupling assembly includes an expansion pin having a central bore and a longitudinal slit, and a taper pin sized for insertion in the central bore of the expansion pin and cooperating with the longitudinal slit to radially expand the expansion pin. The expansion pin and the taper pin together are sized for insertion into the cross bore of the flow control element and through the lateral bore of the valve shaft. A retainer clip is arranged to maintain the taper pin in the central bore of the expansion pin. A first end of the expansion pin has a ramped portion and a first step adjacent the ramped portion, a second end of the expansion pin has a collar and a second step adjacent the collar. The first end of the expansion pin forms a snap fit connection where the first end of the expansion pin and the first step exits the cross bore to create contact between the first step and the flow control element. The collar and the second step of the expansion pin limit insertion of the expansion pin into the cross bore of the flow control element. The retainer clip engaging the collar of the expansion pin is to limit movement of the taper pin relative to the expansion pin.

In accordance with a second implementation of the present invention, valve trim for a rotary valve assembly includes a valve shaft, a flow control element coupled to the valve shaft, and a coupling assembly for coupling the valve shaft to the flow control element. An upper portion of the flow control element includes a mounting bore sized to receive a lower portion of the valve shaft. The flow control element includes a cross bore intersecting the mounting bore. The lower portion of the valve shaft includes a lateral bore. The lateral bore of the valve shaft is arranged to align with the cross bore of the flow control element. The coupling assembly includes an expansion pin having a central bore, and a taper pin sized for insertion in the central bore of the expansion pin. The expansion pin and the taper pin together are sized for insertion into the cross bore of the flow control element and through the lateral bore of the valve shaft. A retainer is arranged to maintain the taper pin in the central bore of the expansion pin. The retainer limits movement of the taper pin relative to the expansion pin.

In further accordance with the foregoing first and/or second implementations, an apparatus and/or method may further comprise or include any one or more of the following implementations.

In accordance with an implementation, the retainer clip includes a retaining ring and the collar of the expansion pin includes an internal groove positioned within the central bore receiving the retaining ring.

In accordance with another implementation, the taper pin includes an end and the retaining ring is spaced from the end of the taper pin.

In accordance with another implementation, the apparatus includes a second shaft including a lateral bore and a second coupling assembly. The valve body includes a second bore and the flow control element includes a second mounting bore and a second cross bore. The second shaft is positioned within the second bore and the second mounting bore and the lateral bore of the second shaft and the second cross bore are substantially coaxial. The second coupling assembly is positioned within the lateral bore of the second shaft and the second cross bore and coupling the second shaft and the flow control element.

In accordance with another implementation, the central bore of the expansion pin includes a first central bore portion and a second central bore portion. The first end of the expansion pin includes the first central bore portion and the second end of the expansion pin includes the second central bore portion. The first central bore portion has a smaller diameter than the second central bore portion.

In accordance with another implementation, the central bore of the expansion pin includes a taper.

In accordance with another implementation, the flow control element includes a counterbore receiving the collar of the expansion pin.

In accordance with another implementation, the expansion pin has a longitudinal slit and the taper pin sized for cooperating with the longitudinal slit to radially expand the expansion pin.

In accordance with another implementation, a first end of the expansion pin has a ramped portion and a first step adjacent the ramped portion and a second end of the expansion pin has a collar and a second step adjacent the collar. The first end of the expansion pin forms a snap fit connection where the first end of the expansion pin and the first step exits the cross bore to create contact between the first step and the flow control element. The collar and the second step of the expansion pin limit insertion of the expansion pin into the cross bore of the flow control element.

In accordance with another implementation, the retainer includes an annulus and a tab coupled to and extending from the annulus. The tab includes an end positioned over top of the taper pin. The annulus is retained between the flow control element and the collar of the expansion pin.

In accordance with another implementation, the tab includes a neck and the end. The end is bent around the neck to position the end over the top of the taper pin.

In accordance with another implementation, the annulus includes a base and a wall extending from the base. The base and the wall define a receptacle to receive the collar of the expansion pin.

In accordance with another implementation, the retainer includes a second tab coupled to and extending from the annulus. The second tab includes an end positioned over top of the taper pin.

In accordance with another implementation, the second tab is positioned approximately 90° relative to the tab.

In accordance with another implementation, the tab and the second tab each include a chamfer.

In accordance with another implementation, the chamfer of the tab and the chamfer of the second tab oppose one another when the tab and the second tab are positioned over top of the taper pin.

In accordance with another implementation, the retainer includes a clip and a tab coupled to and extending from the clip and includes an end positioned over top of the taper pin. The clip is coupled to a second end of the expansion pin.

In accordance with another implementation, the second end of the expansion pin includes a semi-annular extension including ends. The clip is positioned around the extension and includes a pair of retention latches positioned over the ends.

In accordance with another implementation, the extension includes a groove and the clip is positioned within the groove.

In accordance with another implementation, the retainer interacts with the expansion pin to substantially axially and radially secure the retainer to the expansion pin.

In accordance with another implementation, the retainer includes a cap coupled to the second end of the expansion pin and covering the taper pin.

In accordance with another implementation, the coupling between the cap and the second end of the expansion pin includes a threaded connection.

In accordance with another implementation, the retainer includes a fastener having a head and a body. A first end of the expansion pin has a face and the head engaging the face and the body of the fastener threadably engages the taper pin.

In accordance with another implementation, the collar of the expansion pin includes the retainer, and the retainer includes an inwardly bent portion of the collar.

In accordance with another implementation, the taper pin includes the retainer, and the taper pin includes a bent portion.

DETAILED DESCRIPTION

FIGS. 1-4 illustrate a control valve 100 in accordance with a first disclosed example of the present invention. The control valve 100 is a rotary valve and, specifically, a butterfly valve. The control valve 100 may be implemented by a plug valve, a ball valve, a segmented ball valve as examples, however. The control valve 100 includes a valve body 102 having an inlet 104, an outlet 106, a flow passage 107 extending between the inlet 104 and the outlet 106, and a through bore 108 that extends into the flow passage 107. The control valve 100 includes a valve shaft 110 rotatably disposed in the through bore 108 of the valve body 102, and a flow control element 112 is coupled to the valve shaft 110 and disposed in the flow passage 107. The flow control element 112 is shown as a valve disk. The flow control element 112 may be implemented by a plug and/or a ball as examples, however. The valve shaft 110 may be referred to as the driven shaft. The flow control element 112 is shiftable in response to rotation of the valve shaft 110 between an open position and a closed position.

An upper portion 114 of the flow control element 112 includes a mounting bore 116 that is sized to receive a lower portion 118 of the valve shaft 110. The flow control element 112 includes a cross bore 120 that intersects the mounting bore 116, and the lower portion 118 of the valve shaft 110 includes a lateral bore 122. The lateral bore 122 of the valve shaft 110 is arranged to align with the cross bore 120 of the flow control element 112.

The control valve 100 includes a coupling assembly 124 for coupling the valve shaft 110 to the flow control element 112. The coupling assembly 124 includes an expansion pin 126 having a central bore 128 and a longitudinal slit 130. The coupling assembly 124 includes a taper pin 132 that is sized for insertion in the central bore 128 of the expansion pin 126 and cooperates with the longitudinal slit 130 to radially expand the expansion pin 126. The expansion pin 126 and the taper pin 132 together are sized for insertion into the cross bore 120 of the flow control element 112 and through the lateral bore 122 of the valve shaft 110. In the example shown, the coupling assembly 124 includes a retainer clip 136 that is arranged to maintain the taper pin 132 in the central bore 128 of the expansion pin 126. A first end 138 of the expansion pin 126 has a ramped portion 140 and a first step 142 adjacent the ramped portion 140. A second end 144 of the expansion pin 126 has a collar 146 and a second step 148 adjacent the collar 146. The expansion pin 126 includes a central portion 150 between the first end 138 and the second end 144.

The first end 138 of the expansion pin 126 forms a snap fit connection where the first end 138 of the expansion pin 126 and the first step 142 exits the cross bore 120 to create and maintain contact between the first step 142 and the flow control element 112. The collar 146 and the second step 148 of the expansion pin 126 limit insertion of the expansion pin 126 into the cross bore 120 of the flow control element 112, and the retainer clip 136 engages the collar 146 of the expansion pin 126 to limit movement of the taper pin 132 relative to the expansion pin 126. In the example shown, the retainer clip 136 takes the form of a retaining ring 152 and the collar 146 of the expansion pin 126 includes an internal groove 154 positioned within the central bore 128 for receiving the retaining ring 152.

The control valve 100 of FIGS. 1-4 also includes a second shaft 156 including a lateral bore 158 and a second coupling assembly 160. The second shaft 156 may be referred to as the follower shaft. The valve body 102 includes a second bore 162 and the flow control element 112 includes a second mounting bore 164 and a second cross bore 166. The second shaft 156 is positioned within the second bore 162 and the second mounting bore 164 and the lateral bore 158 of the second shaft 156 and the second cross bore 166 are substantially coaxial. The second coupling assembly 160 is positioned within the lateral bore 158 of the second shaft 156 and the second cross bore 166 to couple the second shaft 156 and the flow control element 112. The second coupling assembly 160 is structurally and functionally identical to the first coupling assembly 124. Thus, further details about the second coupling assembly 160 are omitted in the interest of brevity.

Figure 1:
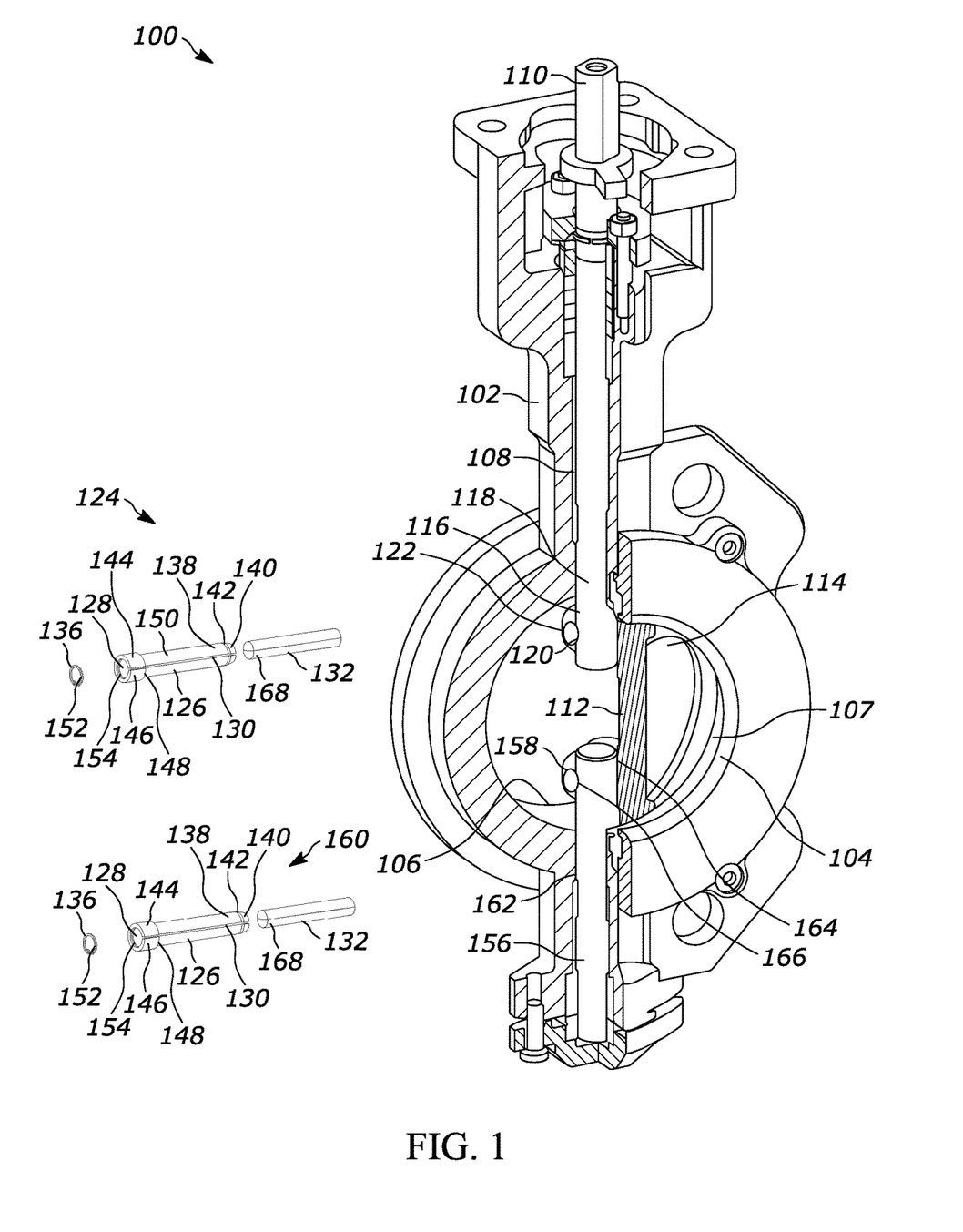
FIG. 1 is an isometric view, partly in cut away, of a control valve in accordance with a first disclosed example of the present invention.
Figure 2:
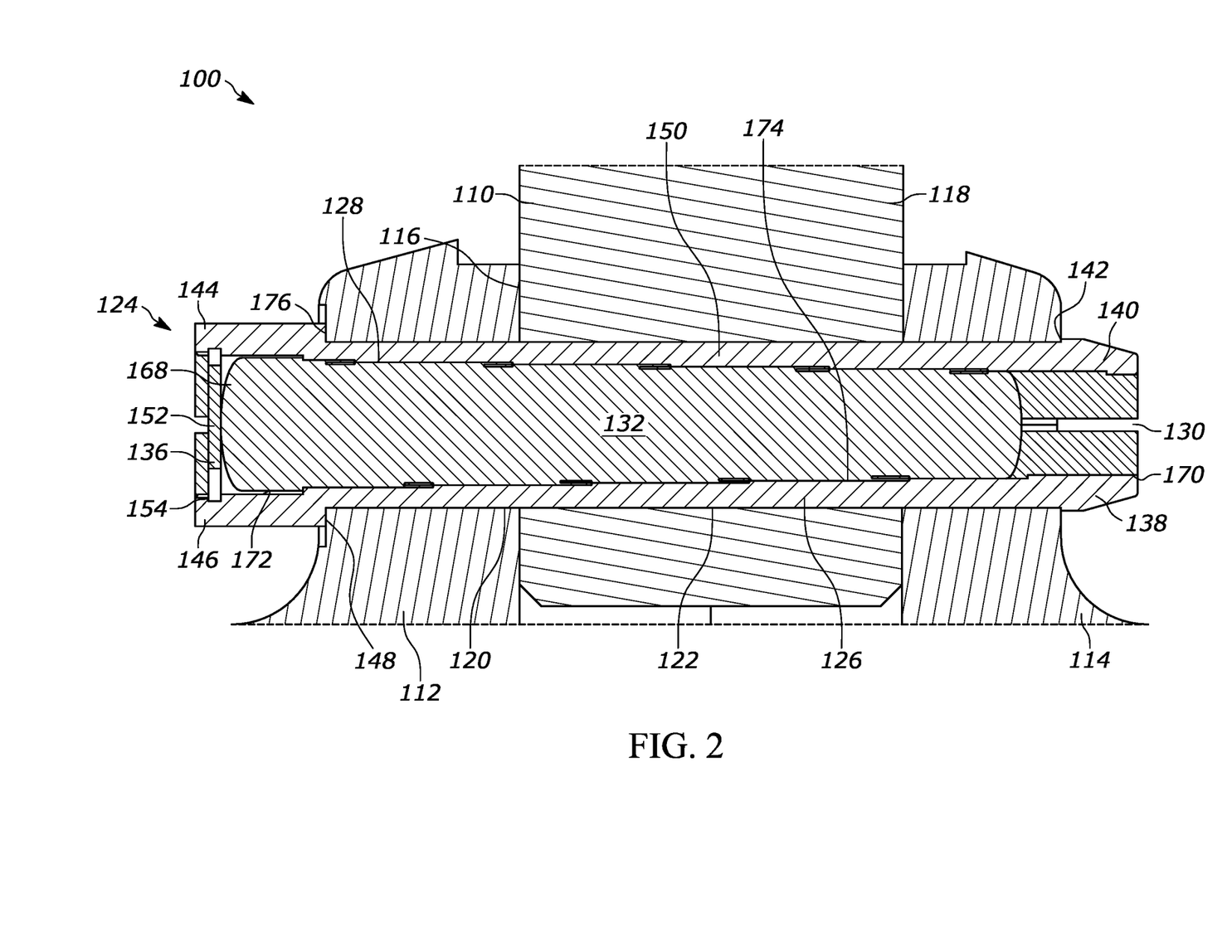
FIG. 2 is an enlarged, fragmentary cross-sectional view of the control valve of FIG. 1.
Figure 3:
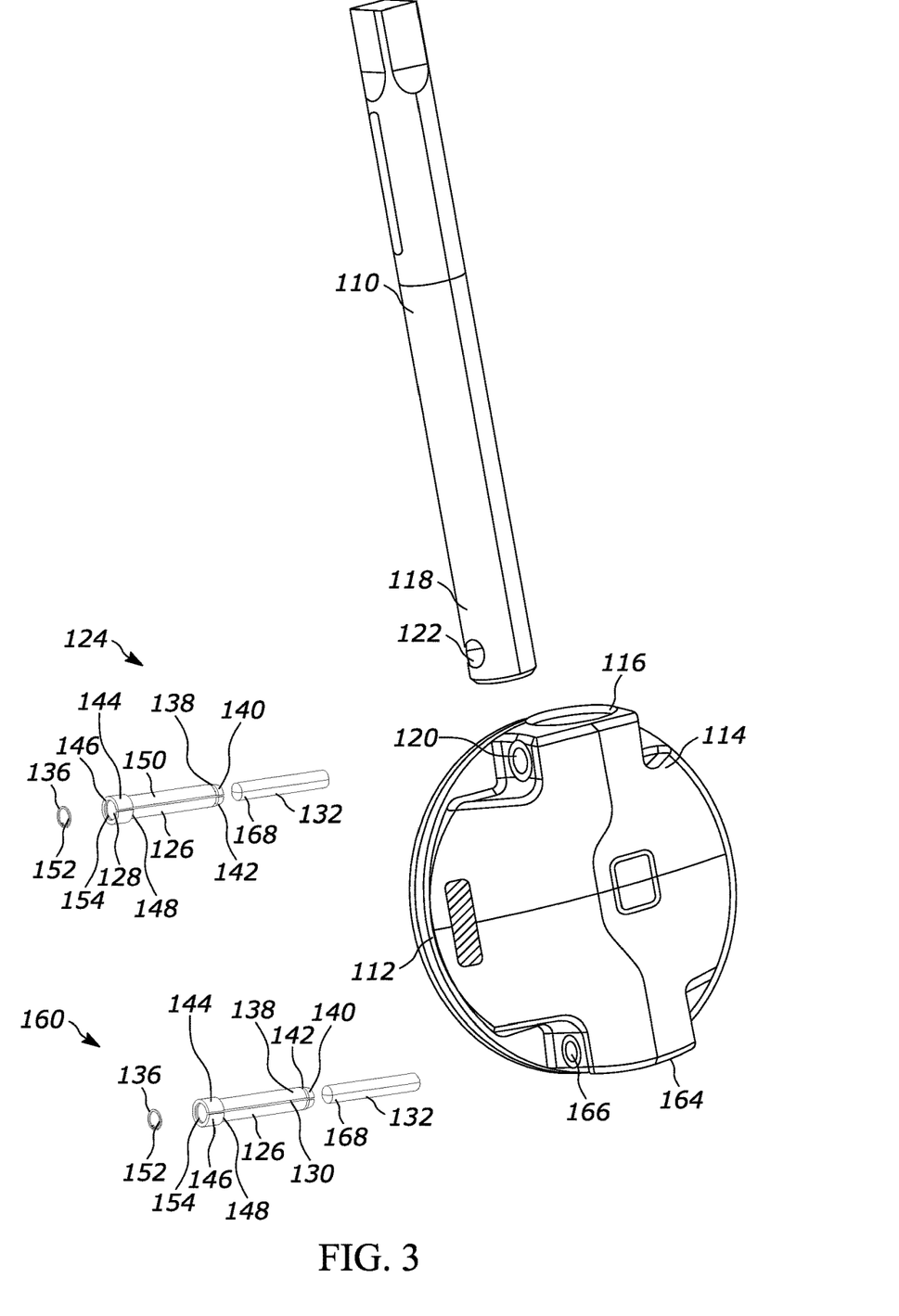
FIG. 3 is an exploded, isometric view of the flow control element, the valve shaft, and first and second coupling assemblies of the control valve of FIG. 1.

As best shown in FIG. 2, the taper pin 132 includes an end 168 and the retaining ring 152 is shown spaced from the end 168 of the taper pin 132. The central bore 128 of the expansion pin 126 includes a first central bore portion 170 and a second central bore portion 172. The first end 138 of the expansion pin 126 includes the first central bore portion 170 and the second end 144 of the expansion pin 126 includes the second central bore portion 172. The first central bore portion 170 has a smaller diameter than the second central bore portion 172 in the illustrated example.

The taper pin 132 is positioned in both the first central bore portion 172 and the second central bore portion 172 and the retaining ring 152 is positioned within the second central bore portion 172. The central bore 128 of the expansion pin 126 may have a taper 174 and the taper pin 132 may have a corresponding taper. The expansion pin 126 may form an interference fit with surfaces of the flow control element 112 and/or the valve shaft 110 when the taper pin 132 is installed within the mounting bore 116 and the cross bore 120. The flow control element 112 is shown including a counterbore 176 that receives the collar 142 of the expansion pin 126. The counterbore 176 may be omitted in other examples, however.

In other examples, the control valve 100 need not include the second shaft 156, the second bore 162, the second mounting bore 164, and the second cross bore 166, in which case the coupling assembly 160 may be omitted. The flow control element 112 and the valve shaft 110 may be attached using only the coupling assembly 124 (i.e., without the second coupling assembly 160 being used) in such an example.

Figure 4:
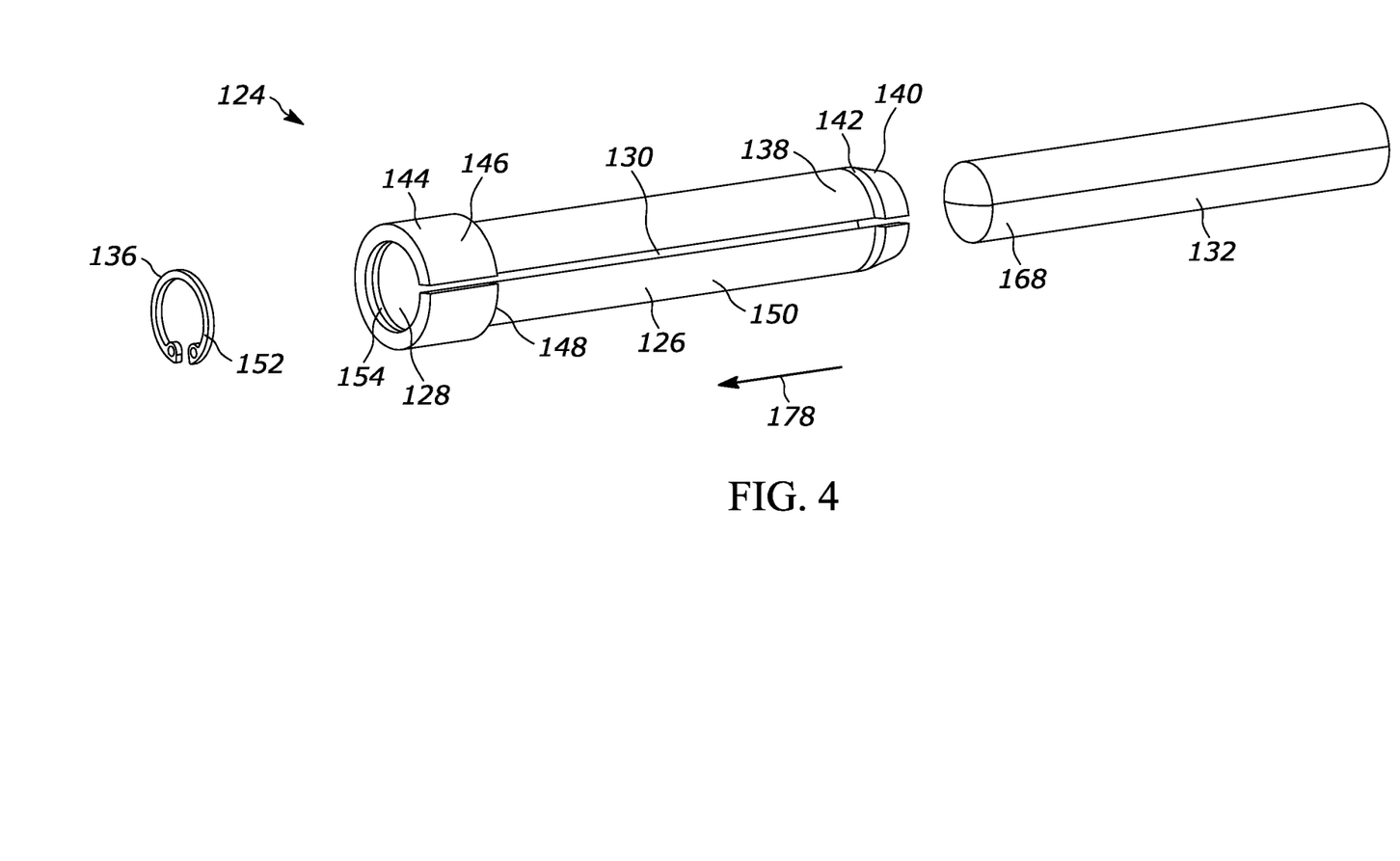
FIG. 4 is an expanded, isometric view of the first coupling assembly of FIG. 1, including the expansion pin, the taper pin, and the retainer clip implemented as a retaining ring.

As illustrated in FIG. 4, the expansion pin 126 includes the longitudinal slit 130, which enables the expansion pin 126 to open and/or radially expand when the taper pin 138 is inserted into the central bore 158 of the expansion pin 126. The longitudinal slit 130 extends through from the first end 138 to the second end 144 of the expansion pin 126 (i.e., the longitudinal slit 130 extends entirely through the expansion pin 126). The longitudinal slit 130 may alternatively partially extend through the expansion pin 126. As discussed above, the retaining ring 152 may be positioned within the internal groove 154 of the expansion pin 126. The position of the retaining ring 152 within the internal groove 154 deters the taper pin 138 from backing out of the central bore 158 of the expansion pin 126 in a direction generally indicated by arrow 178 (see FIG. 4).

Figure 5:
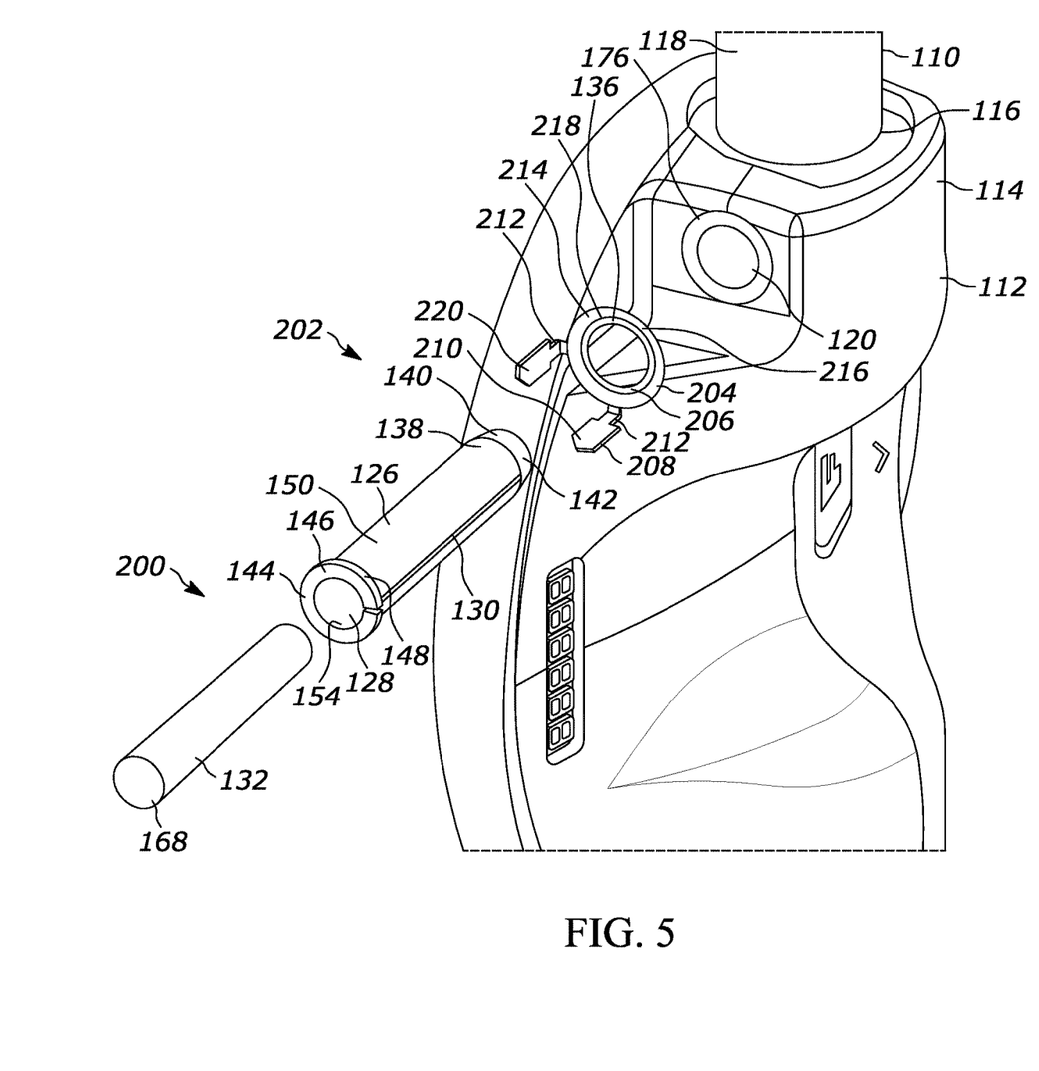
FIG. 5 is an enlarged, fragmentary isometric view of a coupling assembly assembled in accordance with a second disclosed example of the present invention.
Figure 6:
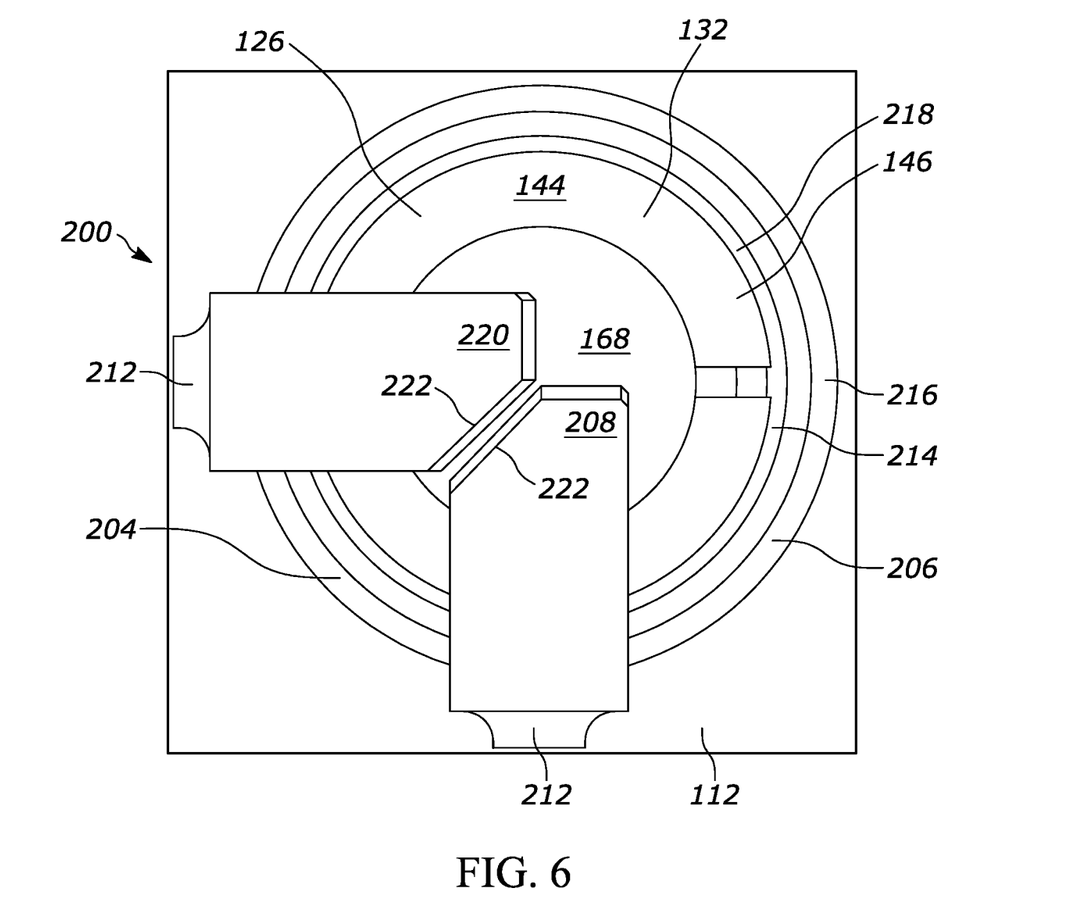
FIG. 6 is an enlarged, end view of the retainer of the coupling assembly FIG. 5.

FIGS. 5 and 6 illustrate a coupling assembly 200 assembled in accordance with a second disclosed example of the present invention. The coupling assembly 200 can be used instead of the first coupling assembly 124 described above so as to couple the valve shaft 110 to the flow control element 112 (and vice-versa). The valve shaft 110, the flow control element 112, and the coupling assembly 200 may be referred to as valve trim 202. The coupling assembly 200 is similar to the coupling assembly 124, in that the coupling assembly 200 includes the expansion pin 126 having the central bore 128, and the taper pin 132, which is sized for insertion in the central bore 128 of the expansion pin 126. However, the coupling assembly 200 differs from the coupling assembly 124 because the coupling assembly 200 includes a different means for limiting movement of the taper pin 132 relative to the expansion pin 126. In the example shown, the coupling assembly 200 is a retainer 204 arranged to maintain the taper pin 132 in the central bore 128 of the expansion pin 126. The retainer 204 limits movement of the taper pin 132 relative to the expansion pin 126. The retainer 204 may be formed from a flat plate or sheet of metal in some implementations that may be processed by annealing.

The retainer 204 includes an annulus 206 and a tab 208 coupled to and extending from the annulus 206. The tab 208 includes an end 210 to be positioned over top of the taper pin 132 as shown in FIG. 6. In this example, the annulus 206 is retained between the flow control element 112 and the collar 146 of the expansion pin 126 as also shown in FIG. 6.

The tab 208 includes a neck 212 and the end 210 where the end 210 is to be bent around the neck 212 to position the end 210 over the top of the taper pin 132. In other examples, however, the tab 208 and/or the end 210 may be sized to not position the end 210 past a center of the taper pin 132. The end 210 not extending past the center of the taper pin 132 may deter fluid flowing through the control valve 100 from bending the tab 208 away from covering the taper pin 132.

The annulus 206 includes a base 214 and a wall 216 extending from the base 214. The base 214 and the wall 216 define a receptacle 218 to receive the collar 146 of the expansion pin 126. The retainer 204 also includes a second tab 220 coupled to and extending from the annulus 206. Like the first tab 220, the second tab 220 includes an end 210 to be positioned over top of the taper pin 132.

The second tab 220 is positioned approximately 90° relative to the tab 208 in the implementation shown. As set forth herein, the phrase "approximately 90°" means +/−5° of 90° and includes 90° itself. The retainer 204, by including both the tab 208 and the second tab 220, may enable the end 210 of one of the tabs 208, 220 to be bent out of position by fluid flowing through the control valve 100 while the end 210 of the other of the tabs 208, 220 remains positioned over top of the taper pin 132, for example.

With reference to FIG. 6, the tab 208 and the second tab 220 are each shown including a chamfer 222. The chamfers 222 on the tabs 208, 220 oppose one another as shown and enable the tabs 208, 220 to be positioned next to one another without one of the tabs 208, 220 being positioned on top of the other of the tabs 208, 220. It will be appreciated that positioning one of the tabs 208, 220 over top of the other of the tabs 208, 220 may enable fluid flowing through the control valve 100 to more easily bend the tabs 208 and/or 220 away from covering the taper pin 132, for example. Thus, the positioning shown in FIG. 6 helps to prevent the fluid flowing through the control valve 100 from easily bending the tabs 208 and/or 220 away from the taper pin 132.

Figure 7:
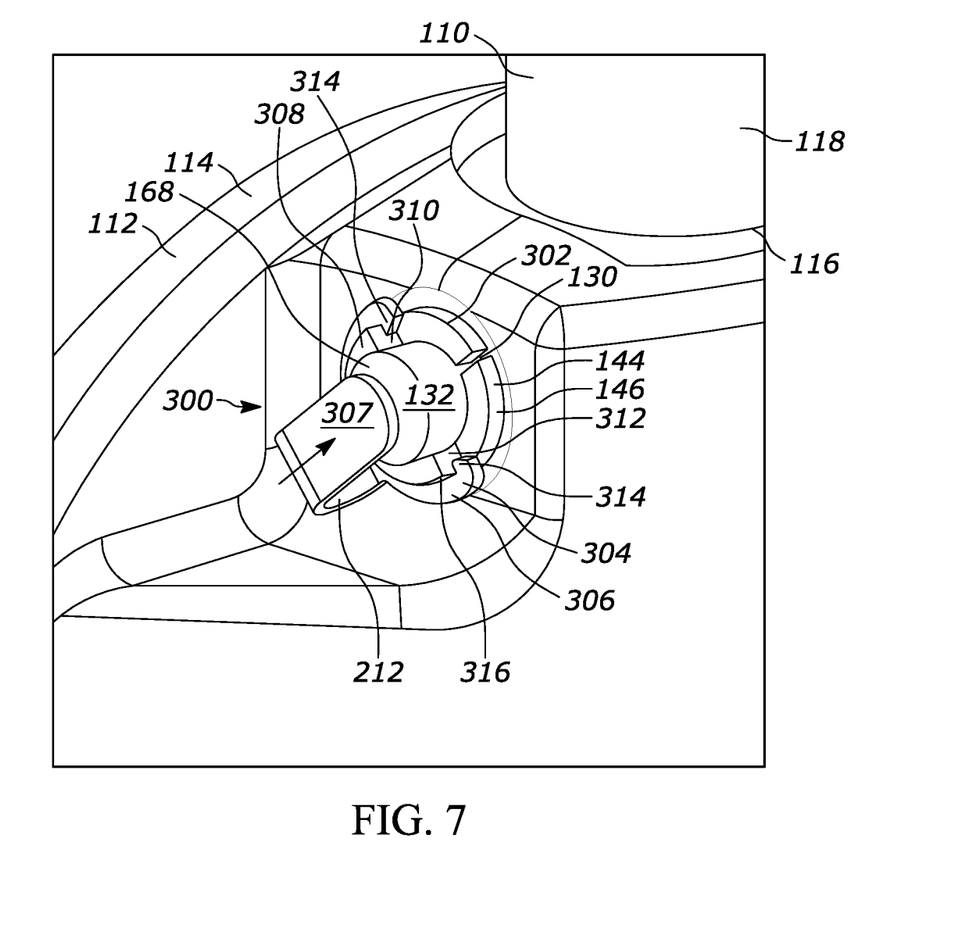
FIG. 7 is a partial, isometric view of a coupling assembly assembled in accordance with a third disclosed example of the present invention.
Figure 8:
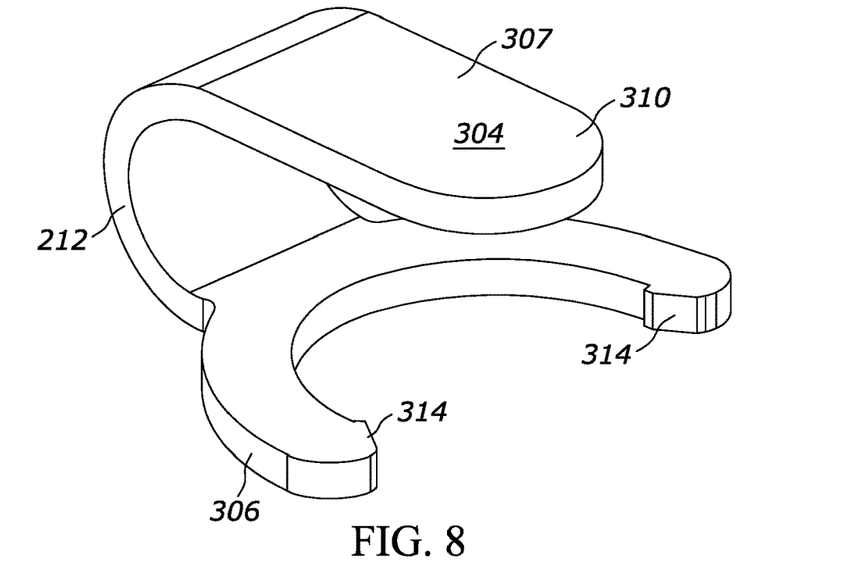
FIG. 8 is an isometric view of the retainer clip of the coupling assembly of FIG. 7.
Figure 9:
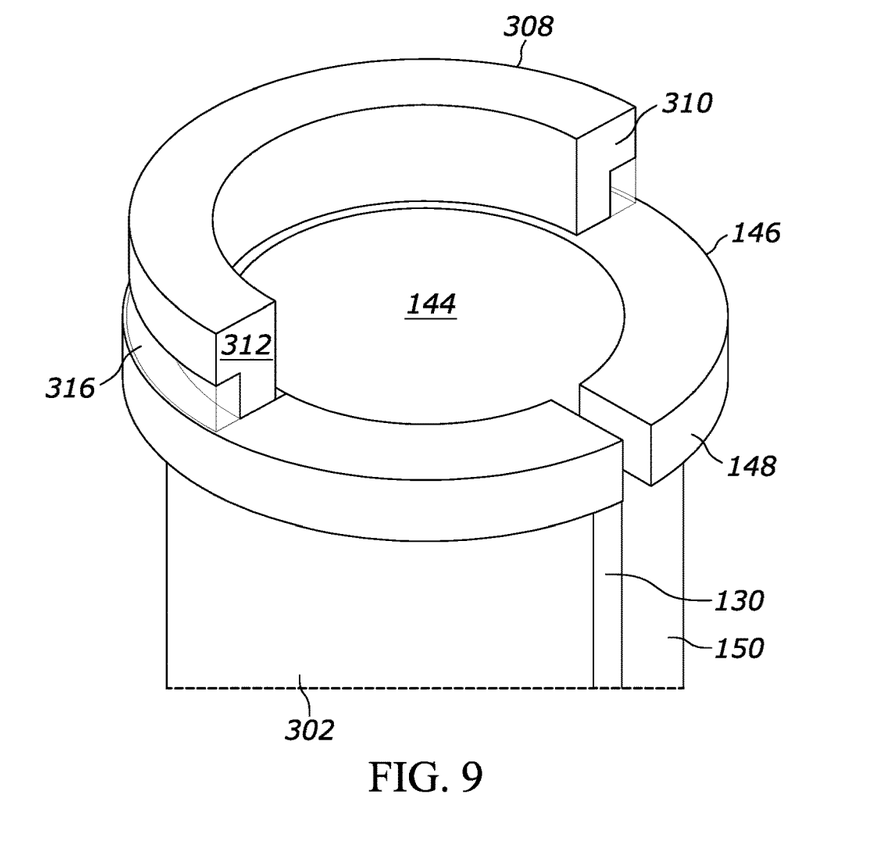
FIG. 9 is an isometric view of the expansion pin of the coupling assembly of FIG. 7.

FIGS. 7-9 illustrate a coupling assembly 300 that is assembled in accordance with a third disclosed example of the present invention and can be used instead of the first coupling assembly 124 or the coupling assembly 200. The coupling assembly 300 includes an expansion pin 302, the taper pin 132, and a retainer clip 304. The retainer clip 304 has a base 306 and a tab 307 coupled to and extending from the base 306. The base 306 is coupled to a second end 144 of the expansion pin 302 and the end 310 of the tab 307 is bent relative to the base 306 to position the end 210 over top of the taper pin 132.

In the example shown, the second end 144 of the expansion pin 302 has a semi-annular extension 308 having ends 310, 312. The base 306 is positioned around the extension 308 and includes a pair of retention latches 314 positioned over the ends 310, 312. The extension 308 also has a groove 316 and the base 306 is positioned within the groove 316. The retainer clip 304 interacts with the expansion pin 302 to substantially axially and radially secure the retainer clip 304 to the expansion pin 302. For example, the interaction between the retention latches 314 and the ends 310, 312 of the extension 308 radially secures the retainer clip 304 to the expansion pin 302 and the base 306 being positioned within the groove 316 axially secures the retainer clip 304 to the expansion pin 302.

Figure 10:
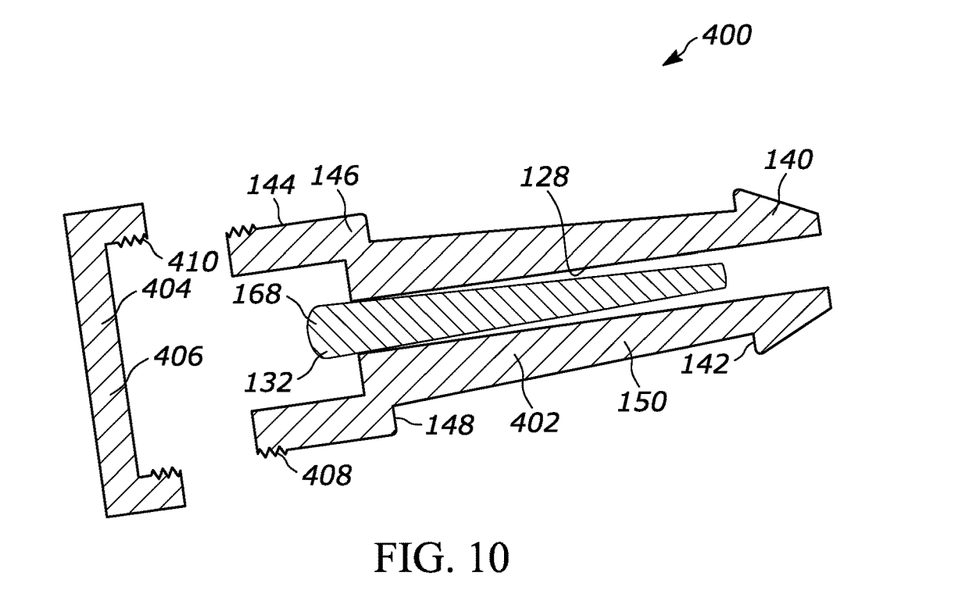
FIG. 10 is a cross-sectional view of a coupling assembly assembled in accordance with a fourth disclosed example of the present invention.

FIG. 10 illustrates a coupling assembly 400 assembled in accordance with a fourth disclosed example of the present invention. The coupling assembly 400 can be used instead of any of the coupling assemblies described above. The coupling assembly 400 includes an expansion pin 402, the taper pin 132, and a retainer 404. The retainer 404 includes a cap 406 that is coupled to the second end 144 of the expansion pin 402 and covers the taper pin 132 when the control valve 100 is assembled. The expansion pin 402 of FIG. 10 is similar to the expansion pin 126 of FIG. 1. The expansion pin 402 of FIG. 10 includes external threads 408, however, and the cap 406 includes internal threads 410. The threads 408, 410 form a coupling between the cap 406 and the second end 144 of the expansion pin 402 that is a threaded connection. In some examples, a space may be provided between the end 168 of the taper pin 132 and the cap 406 to accommodate for manufacturing tolerances. In some examples, a spring washer and/or a thermoplastic ring (e.g., Nylon) may be positioned within the collar 142 to act against the cap 406 to reduce the likelihood of the cap 406 is unthreaded from the expansion pin 402 due to vibration, for example.

Figure 11:
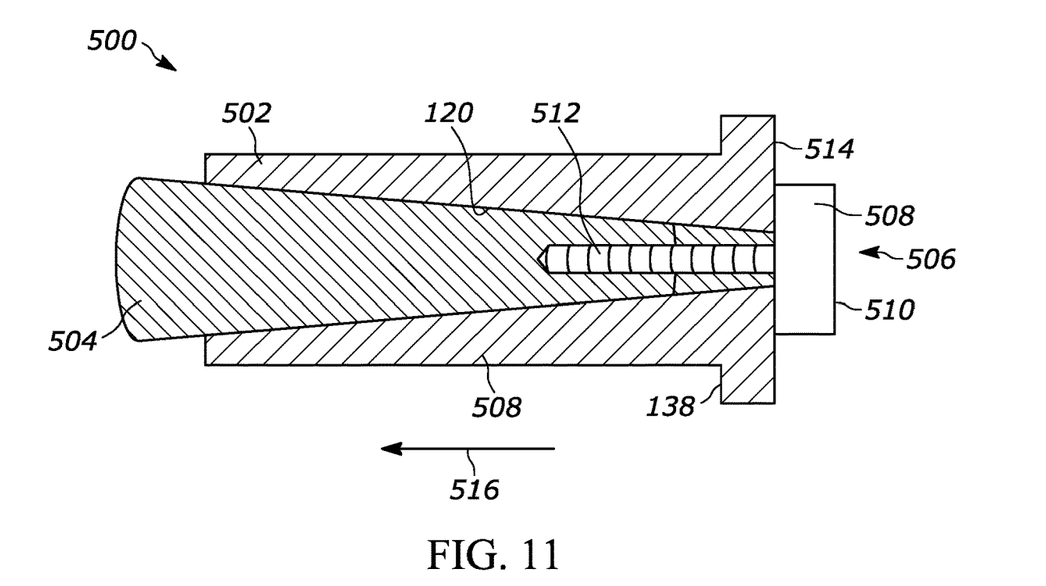
FIG. 11 is a cross-sectional view of a coupling assembly assembled in accordance with a fifth disclosed example of the present invention.

FIG. 11 illustrates a coupling assembly 500 that is assembled in accordance with a fifth disclosed example of the present invention and can be used to instead of the coupling assembly 124 of the control valve 100 of FIG. 1. The coupling assembly 500 includes an expansion pin 508, the taper pin 504, and a retainer 506. The retainer 506 takes the form of a fastener 508 having a head 510 and a body 512. The expansion pin 502 has a first end 138 defined by a face 514, and the head 510 of the fastener 508 engages the face 514 and the body 512 of the fastener 508 threadably engages the taper pin 504. More particularly, the taper pin 504 includes internal threads that are threadably engaged by corresponding threads on the fastener 508. The taper pin 504 may be secured within the central bore 138 of the expansion pin 502 by an interference fit and the fastener 508 may deter the taper pin 504 from backing out of the expansion pin 502 in a direction generally indicated by arrow 516.

Figure 12:
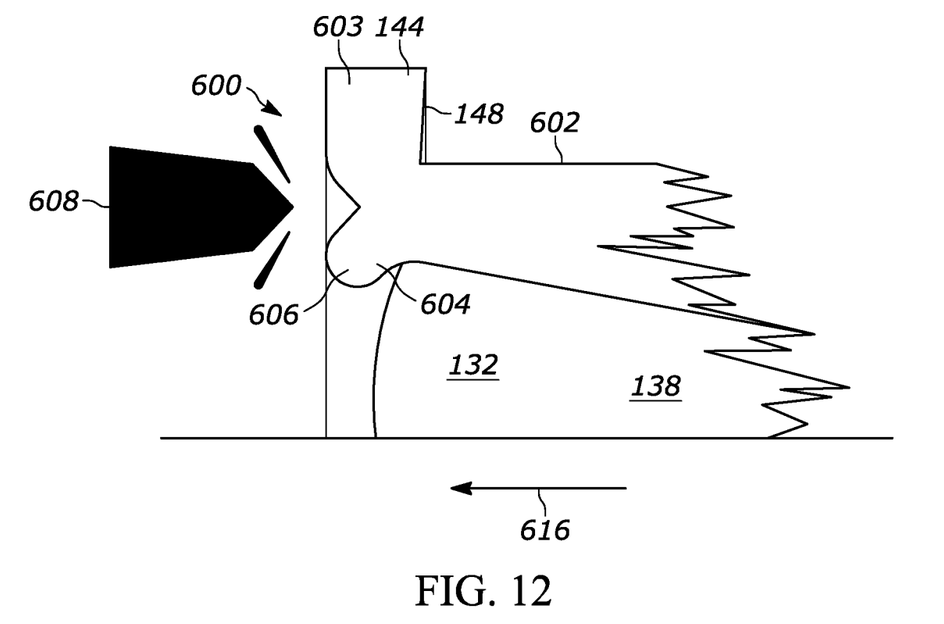
FIG. 12 is a cross-sectional view of a coupling assembly assembled in accordance with a sixth disclosed example of the present invention.

FIG. 12 illustrates a coupling assembly 600 that is assembled in accordance with a sixth disclosed example of the present invention and can be used instead of any of the coupling assemblies described herein. The coupling assembly 600 includes the taper pin 132 and an expansion pin 602 including a collar 603. The collar 603 includes a retainer 604 that is formed by an inwardly bent portion 606 of the collar 603. The collar 603 may have a diameter that is larger than a diameter of the taper pin 132 to allow the collar 603 to be bent inwardly and form the inwardly bent portion 606 and/or to enable the taper pin 132 to be positioned deeper within the central bore 138 of the expansion pin 602. A tool 608 such as a stake may be used to strike the collar 603 and form the inwardly bent portion 606 in some examples. The inwardly bent portion 606 may deter the taper pin 132 from backing out of the expansion pin 602 in the direction generally indicated by arrow 616.

Figure 13:
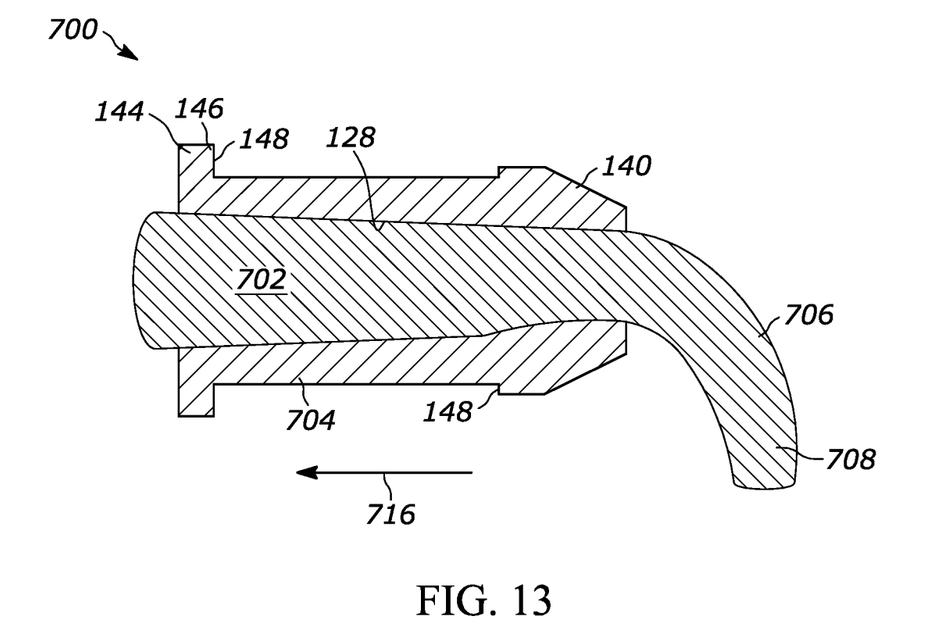
FIG. 13 is a cross-sectional view of a coupling assembly assembled in accordance with a seventh disclosed example of the present invention.

FIG. 13 illustrates a coupling assembly 700 assembled in accordance with a seventh disclosed example of the present invention. The coupling assembly 700 can be used instead of any of the coupling assemblies described herein. The coupling assembly 700 includes a taper pin 702 and an extension pin 704. The taper pin 702 includes a retainer 706 in the example shown that is formed by a bent portion 708 of the taper pin 132. The bent portion 708 may deter the taper pin 702 from backing out of the expansion pin 704 in the direction generally indicated by arrow 716. The flow control element 112 used with the coupling assembly 700 may include a feature such as a protrusion that allows an individual to strike the taper pin 702 with a tool such as a hammer to form the bent portion 708. The taper pin 702 may be struck by the tool in a manner to deter the expansion pin 704 from being damaged.

Further, while several examples have been disclosed herein, any features from any examples may be combined with or replaced by other features from other examples. Moreover, while several examples have been disclosed herein, changes may be made to the disclosed examples without departing from the scope of the claims.

What is claimed is:

1. A rotary valve, comprising:
a valve body having an inlet, an outlet, a flow passage extending between the inlet and the outlet, and a through bore that extends into the flow passage;
a valve shaft rotatably disposed in the through bore of the valve body, and a flow control element coupled to the valve shaft and disposed in the flow passage, the flow control element shiftable in response to rotation of the valve shaft between an open position and a closed position;
an upper portion of the flow control element including a mounting bore sized to receive a lower portion of the valve shaft, the flow control element including a cross bore intersecting the mounting bore;

the lower portion of the valve shaft including a lateral bore, the lateral bore of the valve shaft arranged to align with the cross bore of the flow control element; and a coupling assembly for coupling the valve shaft to the flow control element, the coupling assembly including an expansion pin having a central bore and a longitudinal slit, a taper pin sized for insertion in the central bore of the expansion pin and cooperating with the longitudinal slit to radially expand the expansion pin, the expansion pin and the taper pin together sized for insertion into the cross bore of the flow control element and through the lateral bore of the valve shaft, and a retainer clip arranged to maintain the taper pin in the central bore of the expansion pin;

a first end of the expansion pin having a ramped portion and a first step adjacent the ramped portion, a second end of the expansion pin having a collar and a second step adjacent the collar;

the first end of the expansion pin forming a snap fit connection where the first end of the expansion pin and the first step exits the cross bore to create contact between the first step and the flow control element, the collar and the second step of the expansion pin limiting insertion of the expansion pin into the cross bore of the flow control element; and the retainer clip engaging the collar of the expansion pin to limit movement of the taper pin relative to the expansion pin.

2. The rotary valve of claim 1, wherein the retainer clip is a retaining ring and wherein the collar of the expansion pin includes an internal groove positioned within the central bore for receiving the retaining ring.

3. The rotary valve of claim 2, wherein the taper pin includes an end and the retaining ring is spaced from the end of the taper pin.

4. The rotary valve of claim 1, further including a second shaft including a lateral bore and a second coupling assembly, the valve body including a second bore and the flow control element including a second mounting bore and a second cross bore, the second shaft is positioned within the second bore and the second mounting bore and the lateral bore of the second shaft and the second cross bore are substantially coaxial, the second coupling assembly is positioned within the lateral bore of the second shaft and the second cross bore and coupling the second shaft and the flow control element.

5. The rotary valve of claim 1, wherein the central bore of the expansion pin includes a first central bore portion and a second central bore portion, the first end of the expansion pin including the first central bore portion and the second end of the expansion pin includes the second central bore portion, the first central bore portion having a smaller diameter than the second central bore portion.

6. The rotary valve of claim 1, wherein the central bore of the expansion pin includes a taper.

7. The rotary valve of claim 1, wherein the flow control element includes a counterbore for receiving the collar of the expansion pin.

8. A valve trim for a rotary valve assembly, comprising:
a valve shaft; and
a flow control element coupled to the valve shaft;
an upper portion of the flow control element including a mounting bore sized to receive a lower portion of the valve shaft, the flow control element including a cross bore intersecting the mounting bore;

the lower portion of the valve shaft including a lateral bore, the lateral bore of the valve shaft arranged to align with the cross bore of the flow control element; and a coupling assembly for coupling the valve shaft to the flow control element, the coupling assembly including an expansion pin having a central bore, a taper pin sized for insertion in the central bore of the expansion pin, the expansion pin and the taper pin together sized for insertion into the cross bore of the flow control element and through the lateral bore of the valve shaft, and a retainer arranged to maintain the taper pin in the central bore of the expansion pin;

wherein the retainer limits movement of the taper pin relative to the expansion pin, and wherein a first end of the expansion pin has a ramped portion and a first step adjacent the ramped portion, a second end of the expansion pin having a collar and a second step adjacent the collar, wherein the first end of the expansion pin forms a snap fit connection where the first end of the expansion pin and the first step exits the cross bore to create contact between the first step and the flow control element, the collar and the second step of the expansion pin limiting insertion of the expansion pin into the cross bore of the flow control element.

9. The valve trim of claim 8, wherein the retainer includes an annulus and a tab coupled to and extending from the annulus and including an end positioned over top of the taper pin, the annulus being retained between the flow control element and the collar of the expansion pin.

10. The valve trim of claim 8, wherein the retainer includes a clip and a tab coupled to and extending from the clip and including an end positioned over top of the taper pin, the clip coupled to a second end of the expansion pin.

11. The valve trim of claim 8, wherein the expansion pin has a longitudinal slit, the taper pin sized for cooperating with the longitudinal slit to radially expand the expansion pin.

12. A valve trim for a rotary valve assembly, comprising:
a valve shaft; and
a flow control element coupled to the valve shaft;
an upper portion of the flow control element including a mounting bore sized to receive a lower portion of the valve shaft, the flow control element including a cross bore intersecting the mounting bore;

the lower portion of the valve shaft including a lateral bore, the lateral bore of the valve shaft arranged to align with the cross bore of the flow control element; and a coupling assembly for coupling the valve shaft to the flow control element, the coupling assembly including an expansion pin having a central bore, a taper pin sized for insertion in the central bore of the expansion pin, the expansion pin and the taper pin together sized for insertion into the cross bore of the flow control element and through the lateral bore of the valve shaft, and a retainer arranged to maintain the taper pin in the central bore of the expansion pin;

wherein the retainer limits movement of the taper pin relative to the expansion pin, and wherein the retainer includes an annulus and a tab coupled to and extending from the annulus and including an end positioned over top of the taper pin, the annulus being retained between the flow control element and the collar of the expansion pin.

13. The valve trim of claim 12, wherein the tab includes a neck and the end, the end bent around the neck to position the end over the top of the taper pin.

14. The valve trim of claim 12, wherein the annulus includes a base and a wall extending from the base, the base and the wall defining a receptacle to receive the collar of the expansion pin.

15. The valve trim of claim 12, wherein the retainer includes a second tab coupled to and extending from the annulus, the second tab including an end positioned over top of the taper pin.

16. The valve trim of claim 15, wherein the second tab is positioned approximately 90 relative to the tab.

17. The valve trim of claim 15, wherein the tab and the second tab each include a chamfer.

18. The valve trim of claim 17, wherein the chamfer of the tab and the chamfer of the second tab oppose one another when the tab and the second tab are positioned over top of the taper pin.

19. A valve trim for a rotary valve assembly,
a valve shaft; and
a flow control element coupled to the valve shaft;
an upper portion of the flow control element including a mounting bore sized to receive a lower portion of the valve shaft, the flow control element including a cross bore intersecting the mounting bore;
the lower portion of the valve shaft including a lateral bore, the lateral bore of the valve shaft arranged to align with the cross bore of the flow control element; and
a coupling assembly for coupling the valve shaft to the flow control element, the coupling assembly including an expansion pin having a central bore, a taper pin sized for insertion in the central bore of the expansion pin, the expansion pin and the taper pin together sized for insertion into the cross bore of the flow control element and through the lateral bore of the valve shaft, and a retainer arranged to maintain the taper pin in the central bore of the expansion pin;
wherein the retainer limits movement of the taper pin relative to the expansion pin, and
wherein the retainer includes a clip and a tab coupled to and extending from the clip and including an end positioned over top of the taper pin, the clip coupled to a second end of the expansion pin.

20. The valve trim of claim 19, wherein the second end of the expansion pin includes a semi-annular extension including ends, the clip positioned around the extension and including a pair of retention latches positioned over the ends.

21. The valve trim of claim 20, wherein the extension includes a groove and the clip is positioned within the groove.

* * * * *